Patented July 1, 1952

2,602,086

UNITED STATES PATENT OFFICE 2,602,086

DERIVATIVES OF 4-IMIDAZOLONE

Moses Wolf Goldberg, Upper Montclair, N. J., and Hanns Hanina Lehr, New York, N. Y., assignors to Hoffmann-La Roche Inc., Nutley, N. J., a corporation of New Jersey No Drawing. Application January 11, 1951, Serial No. 205,614

14 Claims. (Cl. 260—309)

The present invention relates to new 4-imidazolone derivatives which in one of their tautomeric forms can be designated as 2-lower alkyl-5-cycloalkylidene-4-imidazolones, and the acid addition salts thereof, wherein the lower alkyl group contains at least two carbon atoms, e. g., ethyl, propyl, butyl, and the like, and wherein cycloalkylidene represents a cyclopentylidene, a cyclohexylidene, or a lower alkoxycyclohexylidene group. The new compounds are useful in the field of pharmaceuticals, and more particularly in the field of sedatives and hypnotics.

The 2-lower alkyl-5-cycloalkylidene-4-imidazolones can be prepared by reacting together a lower alkylimidic acid alkyl ester, e. g., propionimidic acid ethyl ester, butyrimidic acid ethyl ester, or valerimidic acid ethyl ester, a lower alkyl ester of glycine, e. g., glycine ethyl ester, and a reactive cycloaliphatic mono-ketone, e. g., cyclopentanone, cyclohexanone, or lower alkoxycyclohexanones, e. g., p-methoxycyclohexanone and p-ethoxycyclohexanone.

The reagents may be employed in equimolecular amounts, or, if desired, the cycloaliphatic mono-ketones, may be employed in excess, the excess serving as a solvent. The reaction is preferably carried out by heating the mixture of reagents per se, or in the presence of a suitable diluent, for example, benzene.

The lower alkylimidic acid alkyl esters employed in the reaction were prepared from the corresponding hydrochlorides by neutralizing with aqueous potassium hydroxide, and extraction with ether, as illustrated by the following examples:

Example A 13.8 g. of propionimidic acid ethyl ester hydrochloride were dissolved in a minimum amount of water. 100 cc. of ether was added to the resulting solution, and the mixture was cooled to 0°–10° C. There was then added in small portions, a 40 per cent aqueous potassium hydroxide solution with shaking until the reaction mixture was alkaline to litmus. The mixture was saturated with potassium carbonate, the ether layer was decanted and the aqueous phase extracted four times with 100 cc. portions of ether. The combined ether extracts were dried over sodium sulfate. After removal of the ether in vacuo, propionimidic acid ethyl ester was obtained as a colorless liquid.

Example B

Butyrimidic acid ethyl ester was obtained by the same procedure as employed in Example A, there being used 15.2 g. of butyridimic acid ethyl ester hydrochloride in place of the propionimidic acid ethyl ester hydrochloride. The compound was obtained as a colorless liquid.

Example C

Valerimidic acid ethyl ester was obtained by the same procedure as employed in Example A, there being used 16.6 g. of valerimidic acid ethyl ester hydrochloride instead of the propionimidic acid ethyl ester hydrochloride. The compound was obtained as a colorless liquid.

p-Ethoxycyclohexanone, which is employed as an intermediate in the synthesis of some of the new 4-imidazolones, was prepared in the following manner:

34.5 grams of hydroquinone mono ethyl ether in 200 cc. ethanol were catalytically reduced in the presence of 10 grams of Raney nickel at a temperature of 200° C. and a pressure of about 2,000 lbs. per square inch. The reduction was completed in about three hours. The Raney nickel catalyst was then filtered off and the solvent removed in vacuo. The residual oil was fractionated in vacuo and the fraction boiling at 105–110° C./15 mm. collected. Redistillation of the collected fraction yielded p-ethoxycyclohexanol as a colorless liquid boiling at 106–107° C./13 mm.

24 grams of the p-ethoxycyclohexanol were added to a mixture of 42 grams of potassium dichromate, 55 cc. of concentrated sulfuric acid and 180 cc. of water. After standing for several hours, the reaction mixture was repeatedly extracted with ether and the combined ether extracts were dried over sodium sulphate. After removal of the ether, the residual oil was fractionated in vacuo, yielding p-ethoxycyclohexanone as a colorless liquid boiling at 88–90° C./12 mm.

The following examples will serve to illustrate the invention. It will be understood that the invention is intended to embrace the 2-lower alkyl-5-cycloalkylidene-4-imidazolones in their various tautomeric forms, and the claims are to be thus construed.

Example 1

6 grams of propionimidic acid ethyl ester, 6 grams of glycine ethyl ester, and 5.5 grams of cyclohexanone were refluxed in 100 cc. of benzene for 5 hours. After removal of the solvent in vacuo, the residue was dried and recrystallized from ligroin. 2-ethyl-5-cyclohexylidene-4-imidazolone was obtained in the form of white crystals, M. P. 142–143° C.

Example 2

9 grams of propionimidic acid ethyl ester, 9 grams of glycine ethyl ester, and 11 grams of p-methoxycyclohexanone were refluxed in 100 cc. of benzene for 20 hours. After removal of the solvent in vacuo, the residue was dried and recrystallized from ligroin. 2-ethyl-5-(p-methoxycyclohexylidene)-4-imidazolone was obtained in the form of white needles, M. P. 114–116° C.

To prepare the hydrochloric acid addition salt, 450 mg. of 2 - ethyl - 5-(p-methoxycyclohexylidene)-4-imidazolone were dissolved in a minimum amount of absolute alcohol. The solution was saturated with dry hydrogen chloride and absolute ether was added. The precipitated hydrochloride was filtered and recrystallized from ethanol-ether. A white crystalline powder was obtained, M. P. 190–192° C., with decomposition. The hydrochloride was readily soluble in water and alcohol.

Example 3

16 grams of propionimidic acid ethyl ester, 16 grams of glycine ethyl ester and 12 grams of cyclopentanone were refluxed in 150 cc. of benzene for 24 hours. After removal of the solvent in vacuo the semi-solid residue was repeatedly extracted with ligroin. The combined extracts, upon cooling, deposited crystals which upon recrystallization from ligroin yielded 2-ethyl-5-cyclopentylidene-4-imidazolone in the form of white needles, M. P. 120–125° C., with decomposition.

Example 4

10 grams of butyrimidic acid ethyl ester, 9 grams of glycine ethyl ester and 11 grams of p-methoxycyclohexanone were refluxed for 5 hours in 100 cc. of benzene. After removal of the solvent, the residue was recrystallized several times for ligroin. 2-propyl-5-(p-methoxycyclohexylidene) - 4 - imidazolone was obtained in the form of colorless needles melting at 111–113° C.

To obtain the hydrochloric acid addition salt, 1 gram of 2 - propyl-5-(p-methoxycyclohexylidene)-4-imidazolone was dissolved in a minimum amount of absolute alcohol. After saturation of this solution with dry hydrogen chloride, absolute ether was added and the precipitated hydrochloride was filtered off. It was recrystallized from ethanol-ether, yielding a white crystalline powder, M. P. 181–183° C. with decomposition. The hydrochloride was readily soluble in water and alcohol.

Example 5

10 grams of butyrimidic acid ethyl ester, 9 grams of glycine ethyl ester and 12 grams of p-ethoxycyclohexanone were refluxed for 5 hours in 100 cc. of benzene. After removal of the solvent a solid residue was obtained. Recrystallization from ligroin yielded 2-propyl-5-(p-ethoxycyclohexylidene)-4-imidazolone in the form of colorless needles melting at 112–114° C.

Example 6

12 grams of valerimidic acid ethyl ester, 10 grams of glycine ester and 11 grams of p-methoxycyclohexanone were refluxed for 22 hours in 100 cc. of benzene. After removal of the solvent in vacuo, the residue was repeatedly extracted with petroleum ether. The combined extracts, after concentration and chilling, deposited white crystals of 2 - butyl - 5-(p-methoxycyclohexylidene)-4-imidazolone, which, upon recrystallization from petroleum ether, melted at 91–93° C.

Example 7

11 grams of valerimidic acid ethyl ester, 9 grams of glycine ethyl ester and 12 grams of p-ethoxycyclohexanone were refluxed for 5½ hours in 100 cc. of benzene. After removal of the solvent, the residue was recrystallized from ligroin. 2-butyl-5-(p-ethoxycyclohexylidene)-4-imidazolone was obtained in the form of colorless needles melting at 98–99° C.

Example 8

15 grams of propionimidic acid ethyl ester, 15 grams of glycine ethyl ester and 21 grams of p-ethoxycyclohexanone were refluxed for 6 hours in 150 cc. of benzene. After removal of the solvent, the solid residue was recrystallized from ligroin. White needles of 2-ethyl-5-(p-ethoxycyclohexylidene)-4-imidazolone were obtained, M. P. 133–135° C.

To obtain the hydrochloride acid addition salt, 500 mg. of 2 - propyl - 5 - (p - ethoxycyclohexylidene)-4-imidazolone were dissolved in a minimum amount of absolute alcohol, and the resulting solution was saturated with dry hydrogen chloride. Upon addition of absolute ether, the hydrochloride precipitated in the form of white crystals, which upon recrystallization from alcohol-ether melted at 199–201° C. with decomposition.

We claim:

1. 2-lower alkyl - 5 - cycloalkylidene - 4 - imidazolones, wherein the lower alkyl group contains at least two carbon atoms and cycloalkylidene represents a member of the group consisting of cyclopentylidene, cyclohexylidene, and lower alkoxycyclohexylidene, and the acid addition salts thereof.

2. 2-lower alkyl-5-(p-lower alkoxycyclohexylidene)-4-imidazolones, wherein the lower alkyl group contains at least two carbon atoms.

3. 2 - ethyl - 5 - (p - methoxycyclohexylidene) - 4-imidazolone.

4. 2 - ethyl - 5 - (p - ethoxycyclohexylidene) - 4-imidazolone.

5. 2 - propyl - 5-(p-methoxycyclohexylidene) - 4-imidazolone.

6. 2 - propyl - 5-(p-ethoxycyclohexylidene)-4-imidazolone.

7. 2 - butyl-5-(p-methoxycyclohexylidene)-4-imidazalone.

8. The process which comprises reacting together a lower alkyl imidic acid alkyl ester, wherein the lower alkyl radical contains at least two carbon atoms, a glycine lower alkyl ester, and a reactive cycloaliphatic mono-ketone selected from the group consisting of cyclopentanone, cyclohexanone, and lower alkoxycyclohexanones, so as to produce a 2-lower alkyl-5-cycloalkylidene-4-imidazolone, wherein the lower alkyl group contains at least two carbon atoms, and cycloalkylidene represents a member of the group consisting of cyclopentylidene, cyclohexylidene, and a lower alkoxycyclohexylidene.

9. The process which comprises reacting together a lower alkyl imidic acid alkyl ester, wherein the lower alkyl group contains at least two carbon atoms, a glycine lower alkyl ester, and a lower alkoxycyclohexanone so as to produce a 2-lower alkyl-5-lower alkoxycyclohexylidene-4-imidazolone, wherein the lower alkyl group contains at least two carbon atoms.

10. The process which comprises reacting together propionimidic acid ethyl ester, glycine ethyl ester and p-methoxycyclohexanone so as to produce 2-ethyl-5-(p-methoxycyclohexylidene)-4-imidazolone.

11. The process which comprises reacting together propionimidic acid ethyl ester, glycine ethyl ester, and p-ethoxycyclohexanone so as to produce 2-ethyl-5-(p-ethoxycyclohexylidene)-4-imidazolone.

12. The process which comprises reacting together butyrimidic acid ethyl ester, glycine ethyl ester and p-methoxycyclohexanone so as to produce 2-propyl-5-(p-methoxycyclohexylidene)-4-imidazolone.

13. The process which comprises reacting together butyrimidic acid ethyl ester, glycine ethyl ester, and p-ethoxycyclohexanone so as to produce 2-propyl-5-(p-ethoxycyclohexylidene)-4-imidazolone.

14. The process which comprises reacting together valerimidic acid ethyl ester, glycine ethyl ester, and p-methoxycyclohexanone so as to produce 2-butyl-5-(p-methoxycyclohexylidene)-4-imidazolone.

MOSES WOLF GOLDBERG.
HANNS HANINA LEHR.

No references cited.